United States Patent [19]
Ritchey

[11] Patent Number: 6,055,752
[45] Date of Patent: May 2, 2000

[54] EAR TAG WITH LOCKING MEMBER FOR MULTI-PURPOSE STORAGE

[76] Inventor: Eugene B. Ritchey, 13821 Sable Blvd., Brighton, Colo. 80601

[21] Appl. No.: 09/109,832

[22] Filed: Jul. 2, 1998

[51] Int. Cl.[7] .................................................. G09F 3/00
[52] U.S. Cl. ................................................ 40/301; 40/668
[58] Field of Search ............................ 40/300, 301, 302, 40/668; 119/655

[56] References Cited

U.S. PATENT DOCUMENTS

| | | | |
|---|---|---|---|
| Re. 31,940 | 7/1985 | Ritchey ................................. | 119/156 |
| 630,349 | 8/1899 | Harvey . | |
| 2,625,760 | 1/1953 | Cleal ...................................... | 40/668 |
| 3,214,856 | 11/1965 | Brierley ................................. | 40/301 |
| 3,526,987 | 9/1970 | McCarty et al. ....................... | 40/301 |
| 3,552,051 | 1/1971 | Ritchey ................................. | 40/301 |
| 3,595,201 | 7/1971 | Oudenhoven .......................... | 116/114 |
| 3,675,357 | 7/1972 | Magee ................................... | 40/300 |
| 3,731,414 | 5/1973 | Murphy et al. ........................ | 40/301 |
| 3,756,200 | 9/1973 | Ohlhausen ............................. | 119/156 |
| 3,826,030 | 7/1974 | Read ...................................... | 40/301 |
| 3,949,708 | 4/1976 | Meeks ................................... | 119/156 |
| 4,021,952 | 5/1977 | Brierley ................................. | 40/301 |
| 4,059,074 | 11/1977 | Fürer et al. ........................... | 119/156 |
| 4,184,453 | 1/1980 | Ritchey ................................. | 119/156 |
| 4,209,924 | 7/1980 | Fearing ................................. | 40/301 |
| 4,250,643 | 2/1981 | Mackenzie ............................ | 40/301 |
| 4,425,874 | 1/1984 | Child ..................................... | 119/156 |
| 4,471,546 | 9/1984 | Bolling, Jr. ........................... | 40/300 X |
| 4,506,630 | 3/1985 | Hair ....................................... | 119/156 |
| 4,581,834 | 4/1986 | Zatkos et al. ......................... | 40/300 X |
| 4,597,208 | 7/1986 | Chevillot .............................. | 40/301 |
| 4,694,781 | 9/1987 | Howe et al. ........................... | 40/301 X |
| 4,718,697 | 1/1988 | Berardus van Amelsfort ........ | 283/107 |
| 4,741,117 | 5/1988 | Fearing ................................. | 40/301 |
| 4,878,456 | 11/1989 | Howe ................................... | 40/300 X |
| 4,931,788 | 6/1990 | Creswick ............................. | 340/825.54 |
| 4,958,452 | 9/1990 | Tate ....................................... | 40/301 |
| 5,228,224 | 7/1993 | Gardner ................................ | 40/301 |
| 5,357,700 | 10/1994 | Schulte ................................ | 40/300 X |
| 5,461,807 | 10/1995 | Johnson ............................... | 40/300 X |
| 5,473,830 | 12/1995 | Doble ................................... | 40/300 X |
| 5,482,008 | 1/1996 | Stafford et al. ....................... | 119/174 |
| 5,667,515 | 9/1997 | Chu ....................................... | 40/300 X |
| 5,768,813 | 6/1998 | Reboul et al. ....................... | 40/301 |

FOREIGN PATENT DOCUMENTS

| | | |
|---|---|---|
| 154081 | 4/1932 | Switzerland . |
| 1187313 | 4/1970 | United Kingdom . |
| WO 91/10982 | 7/1991 | WIPO .................................. 40/302 |
| WO 92/20221 | 11/1992 | WIPO . |

*Primary Examiner*—Terry Lee Melius
*Assistant Examiner*—Andrea Chop
*Attorney, Agent, or Firm*—Fields and Johnson, P.C.

[57] ABSTRACT

An ear tag is provided which includes a locking member for multi-purpose storage of desired articles. In the first embodiment, the locking member is a transverse portion including a cutting tip for engaging a visual display panel of the ear tag. In another embodiment, the cutting tip may be formed integral with the panel and the transverse portion may include an opening for receiving the cutting tip. In another embodiment, the locking member may be of a conical shape. In yet another embodiment, a two-piece locking assembly is characterized by a retaining section and a cutting tip attached thereto, and a transverse portion which is engaged by the retaining section. Various types of cutting tips are disclosed and additional transverse portions may be provided for additional storage for desired articles. The ear tag is compatible for installation by standard ear tag installation tools.

17 Claims, 3 Drawing Sheets

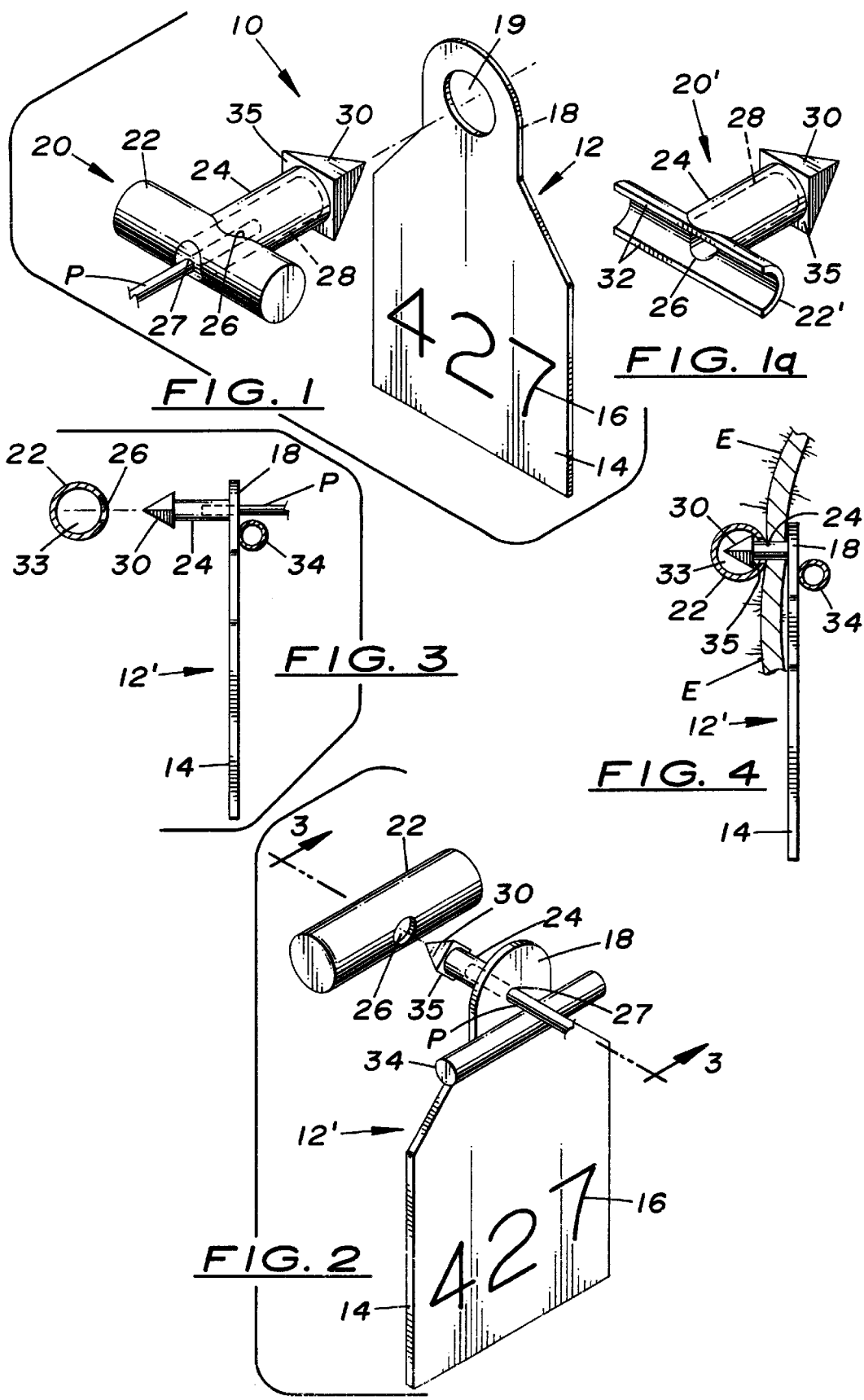

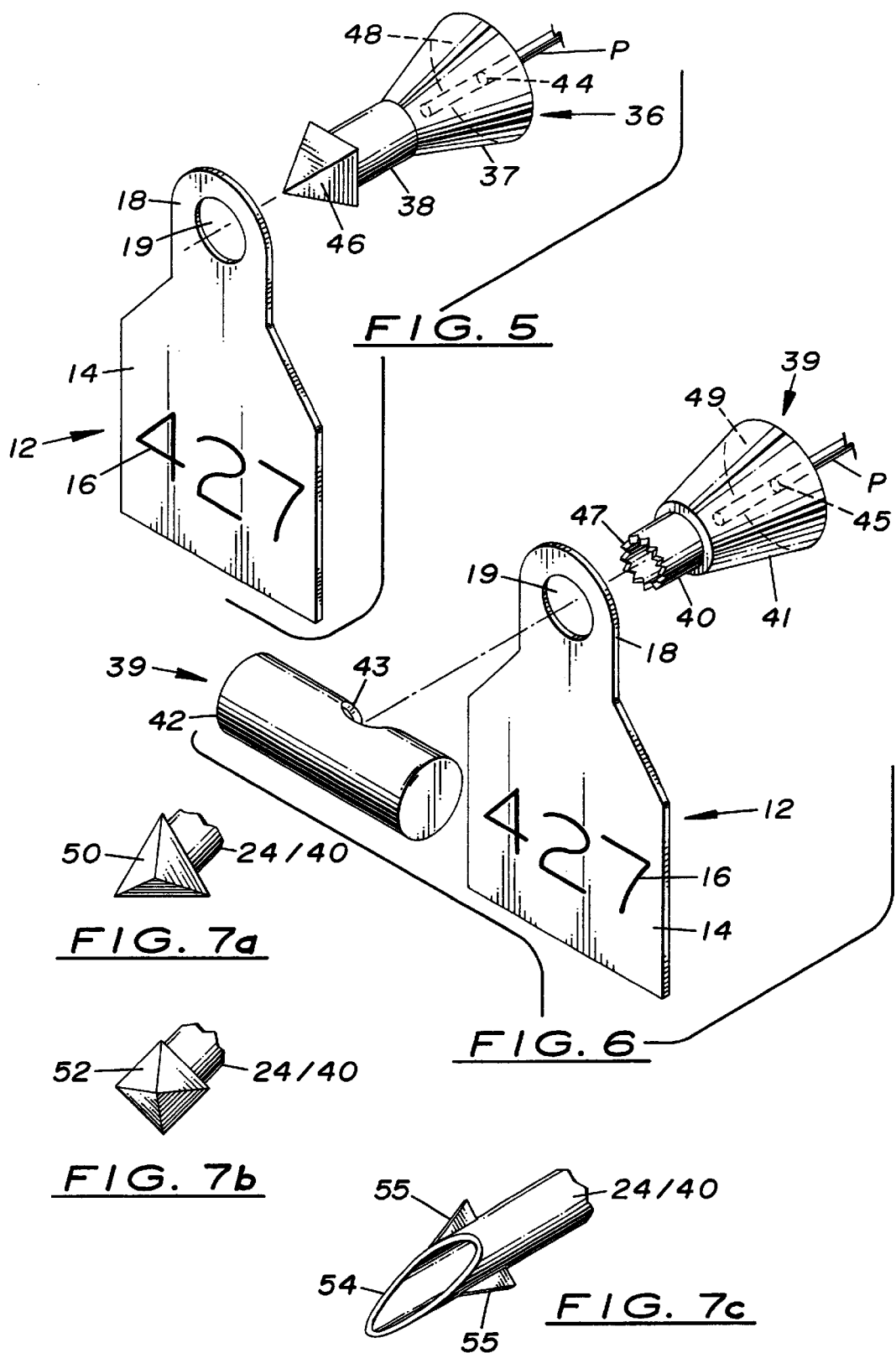

EAR TAG WITH LOCKING MEMBER FOR MULTI-PURPOSE STORAGE

TECHNICAL FIELD

This invention relates to an ear tag and, more particularly, to a livestock identification device in the form of an ear tag which has a locking member which may receive various articles for storage therein.

BACKGROUND ART

Livestock ear or identification tags have been commonly used to identify livestock for centuries. There are a great number of prior art devices which have been used in the past to secure an identification tag to livestock.

One recent technological advance in the marking or tagging of livestock has been the use of very small transmitters which are retained within the ear tag and which may communicate with a receiver which downloads the electronic information from the transmitter. Transmitters of this type are also equipped with memory chips which may contain a wide array of information on the particular animal. Accordingly, the identification of livestock has advanced so that a vast amount of information may be stored within the memory chip and can be easily downloaded to the receiver. This type of technology has greatly improved the capability to track and maintain records on each animal.

Although the above advances have been made for livestock identification, the same general requirements still remain for the use of devices which are attached to an animal's ear. For example, it is advantageous to have ear tags which are easily installed, minimize damage to the animal's ear, and can withstand the stresses which are placed upon the ear tag by the animal and the environment. With the introduction of the above-described electronic tagging means, ear tags now must also be capable of storing the transmitter and other electronic circuitry associated with the transmitter. It is also advantageous to have an ear tag which may be installed by existing ear tag applicators/installers. One prior art example of an ear tag utilizing an electronic tagging means is U.S. Pat. No. 4,718,697. This reference discloses the use of an identification device characterized by a two-piece body portion forming a cavity for storage of an electronic device. An attachment portion connects to the body portion so that the device may be attached to an animal's ear.

Another prior art example of an ear tag utilizing an electronic tagging means is U.S. Pat. No. 5,482,008. This reference discloses a use of a bolus which is retained within the reticulum of the animal. An electronic device is housed and sealed within a glass housing of the bolus. Quartz and fiberglass are also mentioned as being suitable for construction of the housing.

U.S. Pat. No. RE 31,940 discloses an identification tag for livestock which mentions within the disclosure the capability to house an electronic device within a portion of the device.

Although the foregoing inventions are suitable for their intended purposes, none teach or disclose the advantages of the invention as disclosed below.

DISCLOSURE OF THE INVENTION

In accordance with the present invention, an ear tag is provided which includes a locking member for multi-purpose storage. In a first embodiment, the ear tag includes a panel with indicia for providing traditional means of visually identifying the animal. A locking member is provided that engages with the panel for securing both the panel and the locking member to the animal's ear. The locking member has a transverse portion which provides means for storing electronic circuitry or other desired articles. The transverse portion may take many forms. Two preferred forms are either a cylindrical shape or a half-cylindrical shape. A cutting tip is attached to the transverse portion and is the means by which the ear is penetrated for attaching the panel and locking member to the animal's ear.

In another preferred embodiment, the cutting tip may be formed integrally with the panel, and the transverse portion may include an opening for receiving the cutting tip. As with the first embodiment, the transverse portion serves as the means for storing desired articles.

In yet another preferred embodiment, the locking member may include a conical shaped transverse portion which houses the desired articles to be stored.

In yet another preferred embodiment, a two-piece locking assembly is provided which includes a retaining section and a cutting tip attached thereto, and a transverse portion placed on the opposite side of the animal's ear in comparison to the retaining section and cutting tip. The panel may be placed between the transverse portion and the retaining section. The cutting tip attached to the retaining section engages the transverse portion resulting in the two-piece locking assembly being removably attached to the animal's ear. In this embodiment, both the transverse portion and the retaining section may be used for storage.

In all of the embodiments, one or more additional transverse portions may be provided for additional storage of desired articles. These additional transverse portions may be attached to the panel. A number of different types of cutting tips may also be used depending upon the type of incision desired to be made in the animal's ear.

The ear tag of this invention is also compatible with standard installation tools. A small opening may be formed in the transverse portion in order to receive a pin member which is commonly used in installation tools to retain the ear tag during installation.

Other advantages of this invention will become apparent from a review of the following description taken in conjunction with the accompanying drawings.

BRIEF DESCRIPTION OF THE DRAWINGS

FIG. 1 is a partially exploded perspective view of a first embodiment of the ear tag of this invention illustrating a locking member which may be engaged with a panel;

FIG. 1a is a perspective view of a modified locking member according to the first embodiment;

FIG. 2 is a partially exploded perspective view of a second embodiment of the ear tag of this invention illustrating a cutting tip integrally formed with a panel wherein the cutting tip is engageable with a transverse portion;

FIG. 3 is a vertical section taken along line 3—3 of FIG. 2 illustrating the panel with integral cutting tip prior to engagement with the transverse portion;

FIG. 4 is another vertical section taken along line 3—3 of FIG. 2 illustrating the ear tag installed on an animal's ear;

FIG. 5 is a partially exploded perspective view of another embodiment of the ear tag of this invention illustrating a locking member having a cone shaped transverse portion;

FIG. 6 is a partially exploded perspective view of yet another embodiment of the ear tag of this invention illustrating a two-piece locking assembly including a retaining section and a transverse portion;

FIGS. 7a through 7c are fragmentary perspective views of examples of cutting tips which may be used with any of the embodiments.

BEST MODE FOR CARRYING OUT THE INVENTION

Figure 8:
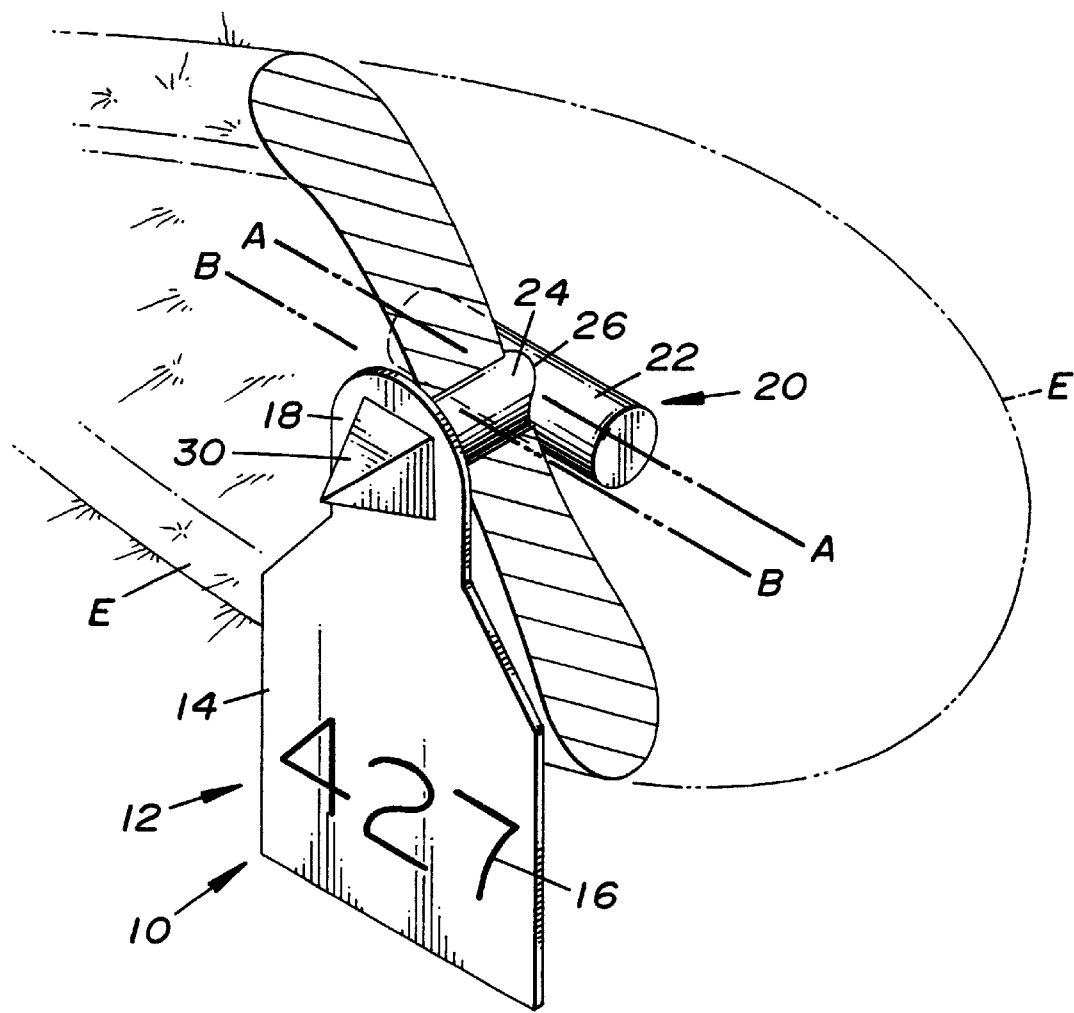
FIG. 8 is a perspective view of the first embodiment installed in an animal's ear.

An ear tag according to a first embodiment of this invention is illustrated in FIGS. 1 and 1a. As shown, ear tag 10 includes two major components, namely, a panel 12 and a locking member 20 which engages the panel. The panel 12 may be made of a desired rigid or flexible material and which may include a body 14 which provides space for indicia 16 stamped or written thereon. A neck 18 of the panel 12 defines an opening 19. Locking member 20 includes a transverse portion 22 which may in the form of a cylinder. The transverse portion may simply be a tube made of a desired plastic or metallic material which has each of its ends closed by means of a resin or other sealing material. An inserting portion 24 connects to the transverse portion 22 by means of an opening 26 which is formed in the side wall of the transverse portion 22. The inserting portion 24 may be secured to the transverse portion 22 by means of a sealing material or epoxy, if desired. Alternatively, the hole 26 may be sized so that a friction fit is achieved between transverse portion 22 and inserting portion 24. In order to provide stiffening support to the inserting portion 24, a stiffener 28 can be placed within the inserting portion 24. Stiffener 28 may simply be an additional tubular or cylindrical member which is placed concentrically within inserting portion 24. This stiffening member may also be made of a desired plastic or metallic material. A cutting tip 30 attaches to the free end of inserting portion 24. Cutting tip 30 is the means by which an incision is made in an animal's ear. The cutting tip is preferably made of a stiff material such as nylon, or other well-known plastics which may be formed in a desired shape and which have sufficient strength to cut and penetrate an animal's ear. A small opening 27 may be formed in the side wall of transverse portion 22 which enables the pin member P of an ear installation tool (not shown) to install the ear tag of this invention. Examples of ear installation tools which may be used to install the ear tag of this invention are described in U.S. Pat. No. RE 31,940; U.S. Pat. Nos. 4,368,735; 4,402,320; 4,552,147; 4,819,639; and 5,462,554. The disclosures of each of these U.S. patents is hereby incorporated herein by reference. In each of these prior art devices, a pin member P is used to releasably hold a portion of the ear tag to be installed wherein the pin is inserted within some cavity or opening formed within the ear tag.

FIG. 1a illustrates a modification to the first embodiment wherein a modified transverse portion 22' is in the form of a half cylinder or channel shape which exposes the side wall 32. Modified transverse portion 22' and inserting portion 24 with cutting tip 30 attached thereto make up a modified locking member 20'. The portion 22' may secure the desired article(s) for storage by sealing the article(s) to portion 22' by a sealant such as acrylic (not shown). In other words, a sealant can be used to encapsulate the article(s) to be stored within portion 22'.

FIG. 2 illustrates another embodiment wherein inserting portion 24 and cutting tip 30 are separated from transverse portion 22 and are attached to the neck 18 of panel 12'. As further explained below, the ear tag of this embodiment is secured to the animal's ear by inserting cutting tip 30 within opening 26. In addition to transverse portion 22, an additional transverse portion 34 may be provided to store additional desired articles. As shown in FIG. 2, second transverse hollow portion 34 attaches to neck 18 on the side opposite inserting portion 24.

As illustrated in FIGS. 3 and 4, the opening 26 of transverse portion 22 is aligned with the cutting tip 30. The animal's ear is placed between transverse portion 22 and cutting tip 30. The cutting tip 30 is then pushed through the ear and into opening 26 wherein the larger section 35 of cutting tip 30 prevents the cutting tip from being pulled back through opening 26. As those skilled in the art will understand, transverse portion 22 or cutting tip 30 may be made of a material which allows some resilient deformation so that cutting tip 30 may be inserted within opening 26 even though the effective diameter of the larger portion 35 exceeds the diameter of opening 26. As seen in FIGS. 3 and 4, transverse portion 22 includes a side wall 32 which defines interior open space 33. As described above, an electronic transmitter is ideally suited for storage within interior open space 33. Because of the elongate shape of transverse portion 22, an electronic transmitter wire may extend the necessary distance in order that an effective signal may be transmitted to a receiver. Although it is contemplated that an electronic transmitter may be placed within interior open space 33, it should also clearly understood that any number of desired articles may be placed therein as well. For example, a desired insecticide to ward off annoying insects may be placed within the interior open space.

FIG. 5 shows another preferred embodiment of the ear tag of this invention characterized by another modified locking member 36 which includes a cone-shaped transverse portion 37 and an inserting portion 38 connected to the small end of cone-shaped transverse portion 37. A cutting tip 46 attaches to the free end of inserting portion 38. As with the previous embodiments, cutting tip 46 may be driven through the animal's ear by means of a pin P which is inserted within opening 44 formed on flat surface 48 of cone-shaped transverse portion 37.

FIG. 6 shows yet another preferred embodiment of the ear tag of this invention. This embodiment can be described as including a two-piece locking assembly 39 comprising a conical retaining section 41 and a transverse portion 42. More specifically, conical retaining section 41 resembles the cone shaped transverse portion 37 of FIG. 5. An inserting portion 40 attaches to the small end of the cone of retaining section 41. A cutting tip 47 is provided in the form of a plurality of jagged serrations formed integrally with the free end of inserting portion 40. Transverse portion 42 is of the same construction as previously described transverse portion 22. Accordingly, transverse portion 42 includes an opening 43 which is sized to receive inserting portion 40. In operation, an animal's ear is placed between panel 12 and cutting tip 47. The cutting tip 47 is driven through the animal's ear and through opening 19. Inserting portion 40 is retained within transverse portion 42 by means of a friction fit between inserting portion 40 and the side wall defining opening 43. Alternatively, an epoxy or resin could be used to secure inserting portion 40 within transverse portion 42. As with the previous embodiments, cutting tip 47 may be driven through the animal's ear by means of a pin member P from an installation tool (not shown). Accordingly, the flat surface 49 of retaining 41 may include an opening 45 for receiving the pin P.

FIGS. 7a, b and c illustrate exemplary cutting tips which may be used with each of the embodiments. Specifically, FIG. 7a shows a three-sided cutting tip 50 formed to a point, FIG. 7b shows a four-sided cutting tip 52 formed to a point, and FIG. 7c illustrates a hypodermic needle-type cutting type 54 having a pair of retaining flanges 55. Although specific cutting tips have been illustrated, it should be understood that any number of other different types of cutting tips may be used to effectively penetrate the animal's ear and to provide a means by which the cutting tip is prevented from being pulled back through either an opening formed in the side wall of the transverse portion or an opening formed in the neck of the panel.

FIG. 8 illustrates the first embodiment of the ear tag of this invention installed on an animal's ear. Specifically, FIG. 8 shows the manner in which the ear tag of FIGS. 1, 1a, or FIG. 5 appear when installed on the animal's ear. As shown, transverse portion 22 extends along axis A—A which is substantially parallel with axis B—B which defines the direction of primary extension of the animal's ear E. Thus, transverse portion 22 because of its transverse positioning with respect to the opening formed through the animal's ear, locks the ear tag to the animal's ear. As previously described, the effective diameter of the larger portion 35 of cutting tip 30 is larger than the opening 19 formed in neck 18 such that the cutting tip 30 will not be inadvertently pulled back through opening 19.

It should also be understood that inserting portion 24 can also be used as a means for storing desired articles. For example, a portion of the electronic transmitter may not be able to be effectively housed within the cylindrical shape of transverse portion 22 because the transmitter may have an irregular shape. Accordingly, a portion of the electronic transmitter could extend into the interior open space within inserting portion 24.

This invention has been described in detail with reference to particular embodiments thereof, but it will be understood that various other modifications can be effected within the spirit and scope of this invention.

What is claimed is:

1. An ear tag comprising:

a panel having an opening;

a locking member having a pin opening adapted for receiving a pin of an installation tool, said locking member including an inserting portion and a transverse portion extending along a longitudinal axis transversely to said inserting portion, said transverse portion having a side wall enclosing an interior open space which extends in a direction along said longitudinal axis for protective storage of desired articles; and a cutting tip attached to said inserting portion, said cutting tip being inserted through said opening in said panel to releasably attach said locking member to said panel.

2. An ear tag, as claimed in claim 1, wherein:

said transverse portion has a cylinder shape.

3. An ear tag, as claimed in claim 1, wherein:

said inserting portion extends substantially perpendicular to said transverse portion.

4. An ear tag, as claimed in claim 1, wherein:

said transverse portion has a channel shape.

5. An ear tag, as claimed in claim 1, further including:

a stiffener positioned within said inserting portion to provide stiffening support thereto.

6. An ear tag, as claimed in claim 1, wherein said ear tag may be installed by an installation tool having a pin.

7. An ear tag, as claimed in claim 1, wherein:

said transverse portion has a conical shape, and said panel is planar.

8. An ear tag comprising:

a panel including an inserting portion extending therefrom;

a cutting tip attached to said inserting portion;

a locking member having a longitudinal axis defining a first transverse portion for releasable attachment to said panel, said first transverse portion having a side wall enclosing an interior open space for protective storage of desired articles, and an opening formed in said side wall, said cutting tip being inserted through said opening to releasably secure said cutting tip to said locking member, said first transverse portion extending along said longitudinal axis and transversely to said inserting portion when said cutting tip is inserted in said opening.

9. An ear tag, as claimed in claim 8, wherein:

said first transverse portion has a cylinder shape.

10. An ear tag, as claimed in claim 8, wherein:

said inserting portion includes a stiffener placed therein to provide stiffening support.

11. An ear tag, as claimed in claim 8, wherein said ear tag may be installed by an installation tool having a pin, and wherein:

said panel and said inserting portion have a continuous opening formed therethrough for receiving the pin of the installation tool.

12. An ear tag, as claimed in claim 8, further including:

a second transverse portion attached to said panel to provide additional protective storage of desired articles.

13. An ear tag comprising:

a panel having first and second sides, and an opening formed therethrough;

a locking assembly adapted for receiving a pin of an installation tool, said locking assembly including a retaining section and an inserting portion extending from said retaining section, said inserting portion and said retaining section being positioned on said first side of said panel, said locking assembly further including a transverse portion extending along a longitudingal axis, and having a side wall enclosing an interior open space, said transverse portion being positioned on said second side of said panel for releasable engagement with said inserting portion, and extending transversely to said inserting portion; and a cutting tip attached to said inserting portion wherein said cutting tip is inserted through said opening in said panel and placed in engagement with said transverse portion to releasably secure said cutting tip to said transverse portion.

14. An ear tag, as claimed in claim 13, wherein:

said transverse portion includes a side wall defining an interior open space for protective storage of desired articles.

15. An ear tag, as claimed in claim 13, wherein said ear tag may be installed by an installation tool having a pin, and wherein:

said retaining section has an opening for receiving the pin of the installation tool.

16. An ear tag, as claimed in claim 13, wherein:

said transverse portion has a cylinder shape.

17. An ear tag, as claimed in claim 13, wherein:

said retaining section has a conical shape.

* * * * *